United States Patent
Yamamura et al.

(10) Patent No.: US 6,187,200 B1
(45) Date of Patent: *Feb. 13, 2001

(54) APPARATUS AND METHOD FOR MULTISTAGE REVERSE OSMOSIS SEPARATION

(75) Inventors: Hiroyuki Yamamura; Masaru Kurihara, both of Otsu; Katsunosuke Maeda, Tokyo, all of (JP)

(73) Assignee: Toray Industries, Inc., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/537,970

(22) Filed: Oct. 2, 1995

(30) Foreign Application Priority Data

Oct. 12, 1994 (JP) .................................. 6-246184

(51) Int. Cl.$^7$ .................................. B01D 61/00
(52) U.S. Cl. ................................ 210/652; 210/641
(58) Field of Search .................. 210/652, 651, 210/641, 295.2, 257.2, 258, 195.2, 805, 87, 90, 750

(56) References Cited

U.S. PATENT DOCUMENTS

| | | | |
|---|---|---|---|
| 3,836,457 | * 9/1974 | Gross et al. | 210/652 |
| 4,083,781 | 4/1978 | Conger . | |
| 4,169,789 | * 10/1979 | Lerat | 210/652 |
| 4,198,293 | * 4/1980 | Ogawa et al. | 210/652 |
| 4,243,523 | * 1/1981 | Pelmulder | 210/652 |
| 4,255,255 | * 3/1981 | Ogawa et al. | 210/652 |
| 4,361,485 | * 11/1982 | Boonstra | 210/195.2 |
| 4,574,049 | * 3/1986 | Dittner | 210/195.2 |
| 4,908,133 | * 3/1990 | Wuest et al. | 210/652 |
| 4,966,708 | 10/1990 | Oklejas et al. | 210/637 |
| 4,983,305 | * 1/1991 | Oklejas et al. | 210/652 |
| 4,988,445 | * 1/1991 | Fulk, Jr. | 210/195.2 |
| 5,122,483 | 6/1992 | Cluff . | |
| 5,238,574 | * 8/1993 | Kwaghima et al. | 210/195.2 |
| 5,252,219 | * 10/1993 | Xu | 210/195.2 |
| 5,266,202 | * 11/1993 | Okonogi et al. | 210/652 |

FOREIGN PATENT DOCUMENTS

| | | |
|---|---|---|
| 0 404 390 | 12/1990 | (EP) . |
| 52-128888 | 10/1977 | (JP) . |
| 54-31088 | 7/1979 | (JP) . |
| 55-027055 | 2/1980 | (JP) . |
| 55-109406 | 8/1980 | (JP) . |
| 61-192307 | 8/1986 | (JP) . |
| 40-04022 | 1/1992 | (JP) . |
| WO-A-95/05344 | 2/1995 | (WO) . |

OTHER PUBLICATIONS

Takeshi, Matsuura "Snythetic Membranes and Membrane Separation Processes", CRC Press, 1994, pp. 83–85.*

K. Scott, "Handbook of Industrial Membranes" pp. 495.*

Junichiro Yoshioka, "High Pressure Pump and Power Recovery Equipment to be Used in Reverse Osmosis Desalination for Seawater", 1980 No. 112, pp. 13–16.

(List continued on next page.)

Primary Examiner—Ana Fortuna
(74) Attorney, Agent, or Firm—Morrison & Foerster LLP

(57) ABSTRACT

This invention relates to an apparatus and method for a multistage reverse osmosis separation which comprises reverse osmosis membrane module units arranged at multistage with a booster pump provided in the concentrate flow channel between reverse osmosis membrane module unit, wherein the total effective reverse osmosis membrane area of a module unit is in the range of 20–80% of that of the preceding module unit. The object of this invention is to provide apparatus and separation method that produce low-concentration solution from high-concentration solution with a high recovery ratio, small energy requirements, and high stability.

13 Claims, 1 Drawing Sheet

OTHER PUBLICATIONS

Hisashi Kimura, "Introduction to Membrane Separation Technology", 1985, vol. 11, No. 1, pp. 34–40.

PB80–186950, U.S. Department of Commerce National Technical Service, 1979, "Reverse Osmosis Technical Manual", pp. 7–12 and 7–13.

Kokai Tokkyo, "Multistage Reverse–Osmos Membrane Separation", vol. 106, 1987, p. 113, Abstract.

W. J. Conlon, et al., "Membrane Softening: The Concept and Its Application to Municipal Water Supply", Desalination, 78 (1990) 157–176.

Bipin S. Parekh, Engineering Feature, Chemical Engineering, 98 (1991) Jan., No. 1, pp. 70–85.

* cited by examiner

APPARATUS AND METHOD FOR MULTISTAGE REVERSE OSMOSIS SEPARATION

FIELD OF THE INVENTION

The present invention relates to novel reverse osmosis separation apparatus and method designed, particularly, for high-concentration solutions. This invention makes it possible to obtain a low-concentration solution from a high-concentration solution with high recovery ratio and with small energy, while it also makes it possible to produce higher-concentration concentrate with smaller energy as compared to conventional reverse osmosis separation. In particular, the apparatus and method of this invention can be used for the desalination of brackish water and sea water, treatment of waste water, recovery of valuable material, etc. The invention is particularly effective for desalination or concentration of high salinity solution.

BACKGROUND OF THE INVENTION

Many techniques are available for solution separation. In recent years, membrane separation has been in wider use because it requires smaller energy and smaller resources. Microfiltration (MF), ultrafiltration (UF) and reverse osmosis (RO) are among the membrane separation techniques. More recently, loose RO or nanofiltration (NF), whose functions are between those of reverse osmosis and ultrafiltration, has come in use. Reverse osmosis, for example, is currently used for desalination of sea water or brakish water to provide water for industrial, agricultural and household uses. With reverse osmosis, a pressure higher than the osmotic pressure is exerted on salt water to allow it to permeate reverse osmosis membrane to obtain desalted water. This technique can produce drinking water from sea water, brine, or a water which contains harmful substances, and has been used for the preparation of ultra-pure water for industrial use, treatment of waste water, and recovery of useful materials.

The production of fresh water from sea water by reverse osmosis has the advantage that it involves no phase transition such as found in evaporation. In addition, it requires less energy and less operation maintenance, resulting in its wider use in recent years.

For separation of a solution by reverse osmosis, it is necessary to supply a solution to the reverse osmosis membrane with a pressure larger than the chemical potential (which can be expressed in terms of osmotic pressure) of the solution which depends on the content of the solute in the solution. When a reverse osmosis membrane module is used for separation from sea water, for example, a pressure above 30 atm, or more practically a pressure above 50 atm, is required. Sufficient reverse osmosis separation performance cannot be obtained at pressures lower than this.

Concerning sea water desalination through reverse osmosis membrane, for example, permeable sea water recovery of conventional sea water desalination is not more than 40%. The concentration of sea water in the reverse osmosis membrane module increases from 3.5% to about 6% as a volume of fresh water equal to 40% of the supplied sea water is obtained through the membrane. A pressure larger than the osmotic pressure corresponding to the concentration of the concentrate (45 atm for 6% sea water concentrate) is required to achieve permeate water recovery ratio of 40%. Practically, a pressure about 20 atm larger than the osmotic pressure that corresponds to the concentrate concentration (which is called the effective pressure) is necessary to produce a sufficient fresh water that can be used as drinking water. Thus, reverse osmosis membrane separation for desalination of sea water have been conventionally operated under a pressure of 60–65 atm to achieve a recovery ratio of 40%.

A higher permeate water recovery (recovery ratio) is more desirable since the recovery ratio directly affects the required cost. Conventionally, however, there have been limits to recovery ratio improvement. That means, an increased recovery ratio may require a very high pressure. In addition, as the concentration of sea water components increases and in higher recovery ratio operating conditions, the contents of scale components such as calcium carbonate, calcium sulfate, strontium sulfate and other salts deposits on the reverse osmosis membrane as scale to cause clogging.

At the recovery ratio of about 40% (which is now widely recognized as the practically maximum recovery ratio), it is unlikely that such scale may be formed in significant amount and therefore no special means are required against them. If an attempt is to be made to operate reverse osmosis separation at a higher recovery ratio, a scale prevention agent that increases the solubility of salts should be added in order to control the deposition of these scale components. Despite the addition of such a scale prevention agent, however, the control of the deposition of said scale components is effective only to increase the concentrate concentration by 10–11 percentage points. For the desalination of sea water of a salt concentration of 3.5%, a mass balance analysis indicates a limit recovery ratio of 65–68%.

Taking into account the effects of various other components of sea water, the practical limit of recovery ratio at which a reverse osmosis sea water desalination plant can be operated stably would be about 60%.

In a practical sea water desalination process, a pressure about 20 atm higher than the concentrate's osmotic pressure should be applied on the reverse osmosis membrane, as stated above. When the salt concentration in sea water is assumed to be 3.5% and a recovery ratio of 60%, the concentration of salt becomes 8.8%, which corresponds to an osmotic pressure of about 70 atm. Thus, a pressure of about 90 atm has to be applied to the reverse osmosis membrane.

For practical uses, several reverse osmosis elements connected in series are loaded in a pressure vessel, which is called a module, and many modules are installed in parallel in a practical plant. The recovery ratio of a sea water desalination plant is defined as the ratio of the total water permeation to the total sea water supplied to the reverse osmosis modules. In an ordinary plant, since modules are installed in parallel, the recovery ratio is equal to the ratio of the desalted water obtained from a module to the sea water supply to that module. In case that one module contains six reverse osmosis membrane elements and that 198 $m^3$/day of sea water is supplied to the module to produce 78 $m^3$/day of desalted water (40% recovery ratio), a simulation shows that 18–19 $m^3$/day and 15–17 $m^3$/day of desalted water comes from the first and second elements, respectively, followed by decreasing amounts from the remaining elements to produce a total 78 $m^3$/day of desalted water. Thus, in total, desalted water is obtained from the entire module at 40% recovery ratio despite a small desalted water recovery ratio for each element.

Prevention of fouling and concentration polarization (localization of solute) is an important factor to be considered in establishing operation conditions of a reverse osmosis membrane separation process. To prevent fouling, the rate of desalted water production from one reverse osmosis membrane element should be controlled below a certain limit (fouling-resistant permissible flux). If the rate exceeds the limit, the fouling on the membrane will be accelerated to cause trouble. The fouling-resistant permissible flux for high-performance reverse osmosis membrane is generally in the vicinity of 0.75 m$^3$/m$^2$·day, which corresponds to an yield of 20 m$^3$/day for a reverse osmosis membrane element with a membrane area of 26.5 m$^2$ (the membrane area of an element is assumed to be 26.5 m$^2$ in all calculations hereinafter). Thus, to prevent fouling, the desalted water production rate of an element should be controlled below 20 m$^3$/day.

The rate of water supply to elements in module decreases as water flows from upstream elements to downstream ones. Concentration polarization referred to above is caused due to a decrease in the flow rate of supplied water through the membrane in the final element. Concentration polarization not only reduces the membrane performance but also accelerate fouling to shorten the life of the reverse osmosis membrane element. To prevent this, the flow rate of the concentrate in the final element (with a membrane area of 26.5 m$^2$) should be maintained above about 50 m$^3$/day.

When a reverse osmosis membrane sea water desalination plant is to be operated at the conventional maximum recovery ratio of about 40%, the above-mentioned fouling and concentration polarization prevention conditions can be easily met and operation can be performed stably by simply arranging several modules in parallel, applying a pressure of 65 atm (when the temperature is 20° C.), and setting the water supply rate to 2.5 times the final desalted water production rate. It is not necessary to give special consideration to the balance among the flow rates or the deposition of scale in the elements in each module.

An increased recovery ratio, however, is essential to further reduce the cost of sea water desalination process by the reverse osmosis membrane. As described above, its increase up to 60% is desired for desalination sea water with a salt concentration of 3.5%. After adding an appropriate amount of a scale prevention agent, the plant have to be operated at 90 atm, which is 20 atm higher than the osmotic pressure of the concentrate.

Scale prevention agents have been used in some reverse osmosis membrane apparatus like those for water processing plants and sea water desalination apparatus that uses evaporation. They are designed, however, mainly for controlling the deposition of such scale components as silica and metal salts within the apparatus. In particular, such agents haven been used widely to treat water with a high silica scale content.

For example, Japanese Patent Laid-Open (Kokai) SHO53-30482 proposes that the life of reverse osmosis membrane can be lengthened when reverse osmosis operation is performed after the contents of calcium, magnesium etc. are reduced by allowing the supply water to make contact with chelate resin. Japanese Patents Laid-Open (Kokai) SHO52-151670 and HEI 4-4022 disclose a method in which a phosphate is added to prevent the formation of scale in reverse osmosis apparatus. Japanese Patents Laid-Open (Kokai) SHO63-218773 and HEI 4-99199 and Japanese Patent Publication (Koho) HEI 5-14039 propose a method in which waste water from electrodeposition coating and copper plating processes is concentrated by subjecting it to reverse osmosis membrane treatment after adding a chelating agent to recover coating material and copper. Furthermore, Japanese Patents Laid-Open (Kokai) SHO63-69586 and HEI 2-293027 disclose that sterilization and stable operation of reverse osmosis membrane apparatus can be achieved by supplying a solution that contains chlorine or a mixture of a oxidizer and a phosphate.

However, if, as in conventional apparatus, several reverse osmosis membrane elements are placed in series in a pressure vessel to produce a module, and a pressure of 90 atm is applied to several such modules arranged in parallel to achieve a desalted water recovery ratio of 60%, then the flow rate of treated water from the upstream elements (first and second elements) in each module will exceed the permissible value to cause concentration polarization and fouling in these elements, leading to clogging and reduction in the life of the elements. As a result, it would become very difficult to operate the reverse osmosis membrane apparatus stably for a long period of time. In a sea water desalination process operated at an recovery ratio of 60%, the salt concentration and osmotic pressure vary from 3.5% to 8.8% and from 26 atm to 70 atm due to material balance requirements as the water flows from the inlet to the outlet. The operating pressure, on the other hand, is nearly constant over the entire process from the inlet to the outlet, indicating that the effective pressure required for the permeation of desalted water (i.e. the difference between the operating pressure and the osmotic pressure) varies largely from 64 atm to 20 atm. The ratio of permeation through the first element to that through the final element in the same module is of the order of the ratio of effective pressure, i.e. 64:20. Thus, in conventional plants, the permeation rate in the first element can undergo a sharp increase to allow the total permeation rate to exceed largely the fouling-resistant permissible limit of 20 m$^3$/day, which means that fouling is caused very easily. However, it is impossible to decrease the operating pressure because an operating pressure of 90 atm is essential to the achievement of an recovery ratio of 60%. This indicates that operation at an recovery ratio of 60% would not be appropriate and if it is attempted despite these considerations, fouling would be accelerated and long-term stable operation would be impossible. Or, operation at a 60% recovery ratio would have to be achieved under very costly operating conditions which may include the use of a large number of low-performance elements with a decreased permeation rate.

Spiral type reverse osmosis membrane elements are considered to make the matter simple in the above description. However, the same phenomena and problems will occur also in hollow fiber membrane type modules.

The present invention provides apparatus and separation method that produces a low-concentration solution from a high-concentration solution with a high recovery ratio, small energy, high efficiency and high stability. In particular, it aims to provide apparatus and method that produces fresh water from sea water with a high 60% recovery ratio, small energy requirements, high efficiency and high stability.

SUMMARY OF THE INVENTION

This invention relates to reverse osmosis separation apparatus comprising reverse osmosis membrane module units arranged in multistage with a pressure pump provided in the concentrate flow channel between reverse osmosis membrane module unit, wherein the total effective reverse osmosis membrane area of a module unit is in the range of 20–80% of that of the preceding module unit; and a method for multistage reverse osmosis separation wherein the concentrate of a module unit is further pressurized and supplied to the next-stage reverse osmosis membrane module unit, wherein the total effective reverse osmosis membrane area of a module unit is in the range of 20–80% of that of the preceding module unit.

DETAILED DESCRIPTION OF THE PREFERRED EMBODIMENTS OF THE INVENTION

Figure 1:
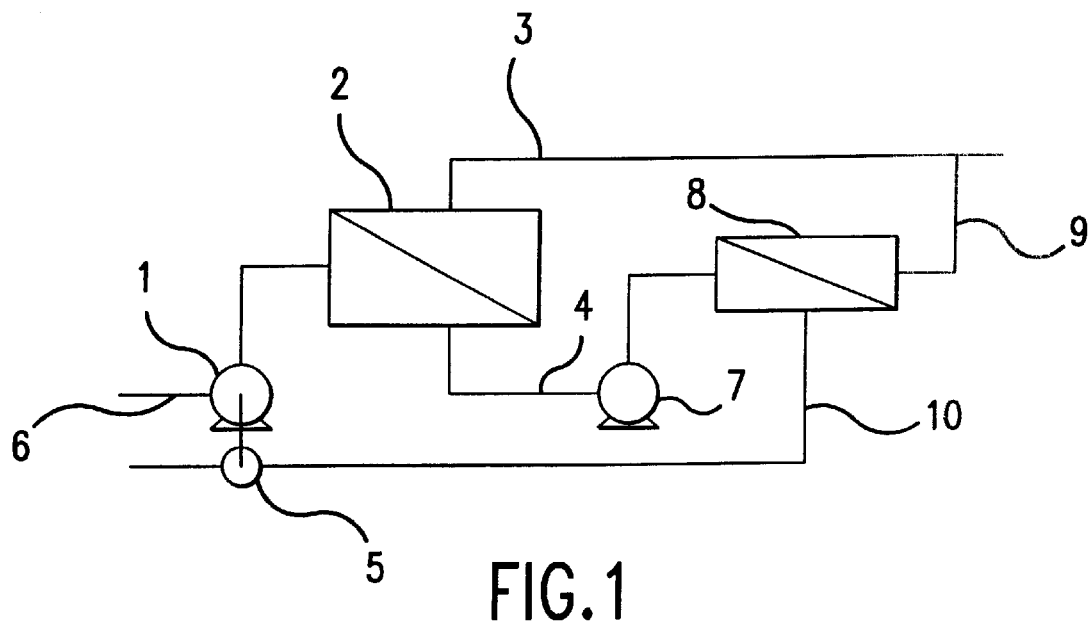
FIG. 1 is a flow diagram showing an example of reverse osmosis membrane apparatus of this invention.
Figure 2:
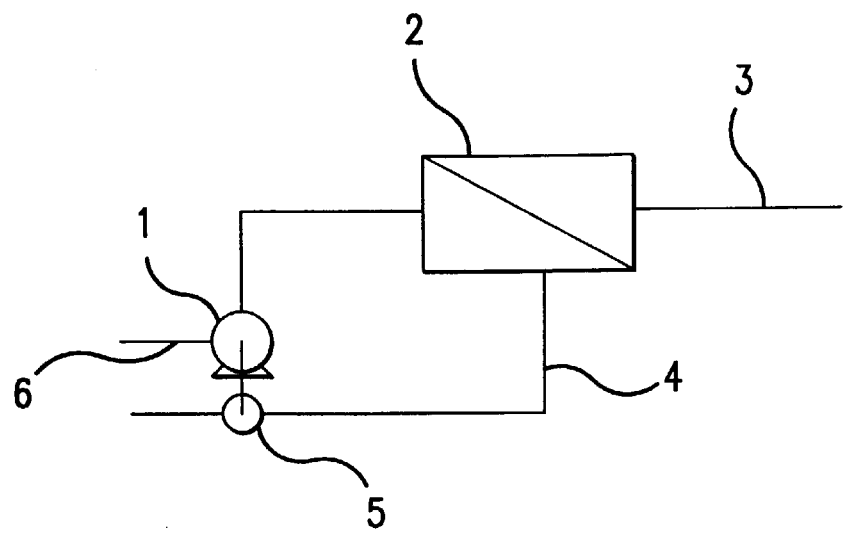
FIG. 2 is a flow diagram showing an example of conventional technique.

In FIGS. 1 and 2, the following reference numerals are employed
1: pressure pump
2: first-stage reverse osmosis membrane module unit
3: first-stage outflow
4: first-stage concentrate
5: energy recovering equipment
6: feed water
7: booster pump
8: second-stage reverse osmosis membrane module unit
9: second-stage outflow
10: second-stage concentrate In case of reverse osmosis membrane separation apparatus consisting of three or more stages the feature of this invention described in the second paragraph on page 7 should be fulfilled for certain two stages, but is not necessarily fulfilled for all stages.

The multistage reverse osmosis membrane separation apparatus as claimed for this invention contains at least a water inlet portion and a reverse osmosis membrane portion. The reverse osmosis membrane portion is defined as the portion intended for separation of feed water to fresh water and concentrate by suppling feed water under a pressure to reverse osmosis membrane modules. Typical reverse osmosis membrane separation apparatus consists of reverse osmosis membrane modules and pressure pumps, with each of the modules consisting of reverse osmosis membrane elements and a pressure container. Before water is supplied to the reverse osmosis membrane, various chemicals including bactericide coagulant, reductant and pH adjuster may be added and pretreatment (removal of turbidity components) is performed by using sand filter, activated carbon filter, safety filter, etc. For the desalination of sea water, for example, sea water is taken in through the water inlet portion and particles are removed in a settling tank, which may contain a bactericide to sterilize the water. Then, a coagulant such as ferric chloride is added, followed by sand filtration. The filtrate, collected in a tank, is then subjected to pH adjustment with sulfuric acid, and sent to a pressure pump. Prior to its feeding to the pump, a reductant such as sodium bisulfite is often added to remove the bactericide, which can cause deterioration of the reverse osmosis membrane material, followed by filtration through safety filter. The water is then pressurized in the pressure pump and fed to the reverse osmosis modules.

The reverse osmosis membrane as referred to herein is defined as semi-permeable membrane that allows some components in a liquid mixture, such as solvent, to pass through while stopping the other components. Polymers including cellulose acetate, polyamide, polyester, polyimide, and vinyl polymer are often used as material for such membrane. In terms of components, there are two types of membrane: asymmetrical membrane and composite membrane. Asymmetrical membrane has a dense layer at least at one side of the membrane, and fine pores with their diameter increasing from the dense layer inward or toward the other side. Composite membrane consists of asymmetrical membrane with a very thin active layer of a different material provided on the dense layer of the membrane. In terms of structure, membrane products are also divided into two groups: hollow fiber type and plane type. The method of this invention, however, can be applied effectively to all these types regardless of the material, components and structure of the reverse osmosis membrane. Typical reverse osmosis membrane materials include cellulose acetate and polyamide for the asymmetrical type, and polyamide and polyurea for the active layer of composite type membrane. Among others, the method of this invention are effective for asymmetrical cellulose acetate membrane and composite polyamide membrane, particularly for composite aromatic polyamide membrane.

The reverse osmosis membrane element is a process unit specially designed for the practical use of such reverse osmosis membrane as described above. Planar membrane may be installed in a spiral, tubular, or plate-and-frame type element while hollow fiber is bundled and installed in an element. The present invention is effective for all types of membrane regardless of these structures.

The reverse osmosis membrane module unit is an array of parallel modules each of which consists of a pressure vessel containing one to several reverse osmosis membrane elements. Any number, combination, and arrangement can be used depending on their uses.

The invention is characterized by the use of more than one reverse osmosis membrane module units and also by their arrangement. It is essential that reverse osmosis membrane module units should be placed in series so that feed water and concentrate flow from one unit to another. Thus, the concentrate from one reverse osmosis membrane module unit becomes the feed water to the next reverse osmosis membrane module unit. The basic construction of reverse osmosis membrane apparatus as claimed herein will be described below with reference to FIG. 1, which gives an example of a sea water desalination plant that uses a technique of the present invention. The plant is designed to produce fresh water at a very high recovery ratio of 60% from sea water of an ordinary concentration of 3.5%. Reverse osmosis membrane separation apparatus consisting of two reverse osmosis membrane module units, one pressure pump, and one booster pump is shown schematically. After pretreatment for removing turbidity components (not shown in FIG. 1), sea water is pressurized to 60–65 atm by pressure pump 1 and fed to the first-stage reverse osmosis membrane module unit. In the first-stage reverse osmosis membrane unit, the feed water is separated into two portions: low-concentration outflow that has permeated the membrane and high-concentration concentrate that cannot permeate the membrane. The outflow is collected for use while the concentrate is fed to the second-stage reverse osmosis membrane module unit after being further pressurized in booster pump 2 from the 60–65 atm (pressure loss omitted for simplicity) to 90 atm, a pressure essential to separation of high-concentration concentrate at a 60% recovery ratio. Reverse osmosis separation is conducted again to separate second-stage outflow from second-stage concentrate. The fresh water recovery ratio, which is 60% in this case, is defined in terms of the ratio of the sum of the first-stage and second-stage outflow to the total sea water fed to the reverse osmosis membrane plant.

The reverse osmosis separation apparatus illustrated in FIG. 1 consists of two reverse osmosis membrane module units, one pressure pump, and one booster pump (pressurized concentrate two-stage process). This example, however, is not intended to limit the number of stages and pumps, but any number of them can be used as required.

Concerning the recovery ratio, though the apparatus and method of the present invention can be used most effectively near the theoretical maximum recovery ratio of 60%, their uses are not limited by this fact and can be applied to conventional plants designed for an recovery ratio of about 40%. Taking the energy cost for the entire plant into account, the target recovery ratio should be above 50%, preferably above 55%.

One pressure pump and one or more booster pumps are used to pressurize feed water to two or more reverse osmosis membrane module units. The pressure pump pressurizes raw water up to above the osmotic pressure of the raw water. An ordinary high pressure pump is used for this purpose. It is essential that the pressure should be above the osmotic pressure of the raw water (referred to simply as osmotic pressure here, but more accurately, the osmotic pressure difference between the raw water and outflow), preferably about 20 atm higher than the osmotic pressure of the concentrate in the first-stage reverse osmosis membrane module unit, but not 50 atm or more higher than that osmotic pressure. For a sea water desalination plant, best results are obtained when the operating pressure of the first-stage module unit is below 70 atm, taking into account the overall power cost. The operating pressure of the final-stage module unit should be about 20 atm higher than the osmotic pressure of the concentrate in the final-stage module unit. For a sea water desalination plant of a 60% recovery ratio, an operating pressure of about 90 atm is favorable taking the cost into account. Higher pressures may be used in such cases where very high performance desalination membrane is required to process high-concentration sea water (the flow rate likely to decrease), though the pressure should be less than about 120 atm (osmotic pressure plus 50 atm) to prevent troubles in the downstream channels in the reverse osmosis membrane elements. Other arrangements may be selected as required. For example, a setup consisting of plural module units with a booster pump provided on each unit for gradual pressure increase may be effective for energy cost reduction. The inventors have made a study about the feasibility of a multistage pressurization type sea water desalination system for cost reduction. Results have shown that such a system works efficiently when the operating pressure of the n-th stage, $P_n$, has the following relation with that of the (n+1)-th stage, $P_{n+1}$:

$$1.15 \leq P_{n+1}/P_n \leq 1.8$$

preferably $$1.3 \leq P_{n+1}/P_n \leq 1.6$$

When a relation between the n-th stage and the (n+1)-th stage is defined for this invention, it is sufficient if such a relation applies to at least one set of two sequential stages.

Preferably, the number of module units of each stage should be decreased in the preceding stage so that the amount of feed water for each module in the preceding stage does not become too small.

It is essential that the total effective reverse osmosis membrane area of a module unit is in the range of 20–80%, preferably, 30–70%, preferably 40–60% of that of the preceding module unit.

Concentrate at a stage is further pressurized by a booster pump and supplied to the next-stage reverse osmosis membrane module as the feed water to that stage. Such a booster pump is required to increase the pressure only slightly (typically, by 10–30 atm) above that of the previous stage. However, the inlet casing of the booster pump should has a sufficient pressure resistance because water pressurized to a significant degree is fed into the inlet casing. Thus, its inlet should be resistant to at least 50 atm. In particular, it is important that the casing and shaft sealer should be sufficiently resistant to pressure. There are no limitations on the type and structure of the booster pump as long as such pressure resistance is ensured.

A pressure container for this invention would be different from one that may be used in such a case where a conventional simple one-stage process is operated under an operating pressure of 90 atm despite the effect of fouling. If a simple one-stage process is to be operated under a pressure of 90 atm, not only the reverse osmosis membrane elements but also the container that contains several elements would have to be resistant to a pressure of 90 atm. In the case of this invention, the first-stage module unit may be operated under a relatively low pressure, say about 60 atm. Thus, pressure containers that are relatively low in pressure resistance may be used to achieve a large cost reduction. The final-stage pressure container, however, should be resistant to at least 80 atm as it is operated normally in the range of 80–100 atm.

There are no special limitations on the feed liquid to be processed by reverse osmosis membrane separation apparatus of this invention, but it would work more efficiently for liquid with a relatively high concentration and high osmotic pressure.

There are no special limitations on the content of the solutes, but the content should preferably be 0.5 wt % or more. Best results would be obtained when this invention is applied to sea water with a high osmotic pressure or high-concentration brine with a salt concentration of about 1% or more.

For the purposes of this invention, plural reverse osmosis membrane module units may be used, but there are no limitations on the number of such units as described above. However, the number of module units should preferably be two or three when cost reduction is important. When reverse osmosis membrane module units are installed at multistage, the flow rate of concentrate relative to that of feed water decreases at each stage. If all stages have the same number of module units, the flow rate of feed water to each module decreases from one stage to next and concentration polarization becomes more likely to occur. Thus, the number of modules in the units at each stage should be decreased from one stage to next to prevent the feed water flow rate to one module from becoming extremely small. For a plant comprising reverse osmosis membrane modules installed at multistage, good results will be obtained when the number of modules at each stage is in the range of 40–60% of that at the preceding stage. For the same reason, the outflow rate should also be decreased in the same way to ensure a good balance of the entire plant. If the number of modules at each stage has been fixed and cannot be changed, the outflow rate can be varied widely by changing the pressure exerted by the booster pumps. Taking into account the overall energy cost for the apparatus, multistage reverse osmosis separation apparatus can work most efficiently when the outflow rate at each stage is in the range of 30–70% of that at the preceding stage.

The invention uses multistage module units with the number of modules decreased from one stage to next at an optimum ratio in order to prevent a sharp decline in the rate of the feed water flow at the upstream side of the membrane in each reverse osmosis membrane module. There is an optimum membrane flow rate, and a large difference in the membrane flow rate among the different stages should be avoided. Among the various concentrate flow rates at the membrane of the various reverse osmosis membrane module units at different stages, the concentrate flow rate at the membrane of the module unit with the largest membrane flow rate ($FR_{max}$: maximum concentrate flow rate at membrane) and the concentrate flow rate at the membrane of the module unit with the smallest membrane flow rate ($FR_{min}$: minimum concentrate flow rate at membrane) should be in the relationship described below in order to reduce the difference in membrane flow rate of sea water among the module units at different stages to ensure stable operation free from concentration polarization:

$$FR_{max}/FR_{min} \leq 1.5$$

preferably, $$FR_{max}/FR_{min} \leq 1.3$$

In this invention, the concentrate from the final-stage reverse osmosis membrane module unit has pressure energy, which should be recovered by energy recovery methods. Methods available for recovering the energy from the final-stage concentrate include the use of a turbine, water wheel, etc. to reduce the shaft power load on the booster pump at the preceding or any other stage or the pressure pump at the first stage. To make the most use of recovered energy, however, the best way is to return the energy directly to the energy recover turbine connected directly to the pressure pump at the first-stage module unit that needs the largest energy.

The invention is intended particularly for sea water desalination at a high recovery ratio, and the addition of a scale prevention agent is effective for stable operation.

The scale prevention agents available for addition to the feed water to reverse osmosis separation apparatus of this invention include organic or inorganic ionic polymers and monomers that can form complex with metal or metallic ion in a solution to solubilize the metal or metallic salt. The ionic polymers include synthetic polymers such as polyacrylic polymers, sulfonated polystyrene, polyacrylamide, and polyacrylamine, as well as natural polymers such as carboxymethyl cellulose, chitosan, and alginic acid. The organic monomers include ethylenediaminetetraacetic acid (EDTA). The useful inorganic scale prevention agents include polyphosphates. Of these scale prevention agents, polyphosphates and EDTA are particularly suitable for this invention because of their availability, easiness of handling due to high solubility, and low price. A polyphosphate is a polymerized inorganic phosphate that consists of sodium hexametaphosphate units, or other similar molecular units with two phosphorus atoms, connected to each other by an phosphorus atom and an alkali metal or alkaline earth metal. Such polyphosphates include tetrasodium pyrophosphate, disodium pyrophosphate, sodium tripolyphosphate, sodium tetrapoly-phosphate, sodium heptapolyphosphate, sodium decapolyphosphate, sodium metaphosphate, sodium hexametaphosphate, and their potassium salts.

These scale prevention agents may be added to the feed water up to any concentration if such a concentration is sufficient to take in the scale components. In general, however, the optimum concentration may be in the range of 0.01–100 ppm, considering the cost and handling characteristics such as the time required for dissolution. For sea water, it is generally in the range of 0.1–50 ppm, particularly on the range of 1–20 ppm, depending on the properties of feed water. Concentrations below 0.01 ppm will not be sufficient for adequate control of scale formation, leading to deterioration in the membrane performance. If their concentration is above 100 ppm, the scale prevention agents themselves are adsorbed over the membrane surface to decrease the fresh water yield or to cause deterioration in the water properties. However, their addition up to a concentration of several tens to several hundreds ppm may be required for feed water countering large amounts of scale components or metals.

The invention makes possible high-recovery ratio desalination of sea water, which is difficult to achieve by the conventional simple one-stage process, as well as large reduction in cost and improvement in stability. Stability of operation can be further improved by clearing the feed water to an extreme degree before its feeding to the module units arranged in multistage. Studies carried out by the inventors have shown that pretreatment of sea water prior to desalination with filtration membrane such as with ultrafiltration membrane or microfiltration membrane is very effective. Among them, hollow fiber ultrafiltration membrane is preferable. The pretreatment apparatus usually consists of hollow fiber membrane modules containing a bundle of many hollow fiber membranes. Sea water becomes highly clear as it is filtered by the apparatus. The hollow fiber membrane must remain serviceable over a long period of time as the surface of the hollow fiber membrane is subjected regularly to physical cleaning. The methods available for such physical cleaning of the hollow fiber membrane include the use of reverse flow of filtrate, air flushing, and scrubbing.

A hollow fiber membrane module as used for this invention is produced from a bundle of hollow fiber membrane bundle which are adhered to each other at both ends and then cut to open the hollows of them. There are no limitations on the structure, but an optimum structure can be determined taking into account the means to be used for physical cleaning. The most desirable ones include a module that consists of a tank-like container containing several hollow fiber membrane elements. Such a structure is very desirable because modules with a large capacity can be constructed. The useful membrane materials for such hollow fiber membrane modules include, but not limited to, polyethylene, polypropylene, polyvinyl alcohol, cellulose acetate, polyacrylonitrile, and any other porous hollow fiber membrane materials. Particularly desirable hollow fiber membrane materials include polymers that consist of acrylonitrile as a component. The most desirable acrylonitrile polymers include acrylonitrile copolymers produced from 50 mol % or more, particularly 60 mol % or more, of acrylonitrile and 50 mol % or less, particularly 0–40 mol %, of one or more vinyl compounds that can form a copolymer with acrylonitrile. A mixture of two or more of these acrylonitrile polymers and a mixture of one or more of these acrylonitrile polymers and one or more other polymers may also be useful. Such vinyl compounds as described above are any know compounds that can form a copolymer with acrylonitrile. The desirable copolymer components include, but not limited to, acrylic acid, itaconic acid, methyl acrylate, methyl methacrylate, vinyl acetate, sodium allyl sulfonate, and p-sodium styrene sulfonate.

The present invention can provide apparatus and separation method that produce low-concentration solution from high-concentration solution with a high recovery ratio, small energy requirements, and high stability.

As a matter of course, this invention can also be applied to a wide variety of reverse osmosis membrane separation processes other than sea water desalination, including chemical processes and food separation.

EXAMPLE 1

The reverse osmosis membrane separation apparatus constructed and used for the sea water desalination experiments consists of a first-stage module unit, a second-stage module unit, a pressure pump to pressurize the feed water (sea water) to send it to the first-stage module unit, and a booster pump to further pressurize the concentrate in the first-stage module unit to send it to the second-stage module unit, as illustrated in FIG. 1. The first-stage module unit consists of four modules each consist of a pressure vessel containing six elements of polyamide reverse osmosis membrane, each with a membrane area of 26.5 m$^2$ and having a salt rejection of 99.5% and a fresh water production rate of 15 m$^3$/day under standard conditions (pressure 56 atm, sea water concentration 3.5%, temperature 25° C., and recovery ratio 12%), and the second-stage module unit consists of two such modules. For energy recovery, the concentrate at the second stage is returned to the energy recovering turbine that is connected directly to the first-stage pressure pump. Sea water pumped up by the first-stage pressure pump is fed to the first-stage reverse osmosis membrane module unit under a pressure of 65 atm, and the first-stage concentrate (63 atm) is pressurized by the booster pump up to 90 atm. When sea water is fed at a rate of 770 m$^3$/day, fresh water that meets the drinking water standards is produced at a rate of 300 m$^3$/day at the first stage and 162 m$^3$/day at the second stage. The recovery ratio is 60%. The outflow from the most upstream element in the first stage module unit is 18 m$^3$/day, and the power consumption per cubic meter of outflow is 4.5 kWh.

COMPARATIVE EXAMPLE 1

The reverse osmosis membrane separation apparatus constructed and used for the sea water desalination experiments consists of a reverse osmosis membrane module unit and a pressure pump to pressurize the feed water (sea water) to send it to the module unit, as illustrated in FIG. 2. The module unit consists of a pressure vessel containing six reverse osmosis membrane elements, each element being the same as those used in Example 1.

Fresh water is produced at a rate of 498 m$^3$/day at the first stage at an recovery ratio of 60%. The outflow from the most upstream element is 22 m$^3$/day, which is above the fouling-resistance permissible limit, indicating that the apparatus will not remain serviceable over a long period of time. The power consumption per cubic meter of outflow is 4.9 kWh.

EXAMPLE 2

Sea water is filtrated through an ultrafiltration membrane module unit consisting of stainless steel container containing seven ultrafiltration membrane modules, each having a membrane area of 15 m$^2$ and made up of 12,000 hollow fiber ultrafiltration membranes of polyacrylonitrile with a molecular weight of 400,000, having outer diameter of 500 $\mu$m, and inner diameter of 350 $\mu$m. The filtering rate is 100 m$^3$/day and the operating pressure for the filtration is 0.5 atm. For the sea water before processing, the turbidity is 3.0 and the fouling index (FI), which indicates the degree of clogging of the membrane, is not measurable (FI$\geq$6.5), but the sea water after the filtrate processing has a turbidity of 0.1 and a FI value of less than 1. For the same sea water, a test for continuous desalination is carried out using concentrate-pressurization type reverse osmosis membrane apparatus that consists of eight polyamide reverse osmosis membrane elements (four modules, each containing two elements) at the first stage and four elements (two such modules as above) at the second stage, each element with a membrane area of 6.6 m$^2$ and having a salt rejection of 99.5% and a fresh water production rate of 3.75 m$^3$/day under standard conditions (pressure 56 atm, sea water concentration 3.5%, temperature 25° C., and recovery ratio 12%). The continuous sea water desalination test is performed at the first-stage pressure of 65 atm and the second-stage pressure of 90 atm. As a result, outflow is obtained from sea water at a rate of 40 m$^3$/day and an recovery ratio of 60%. The outflow rate (equivalent at 25° C.) remain practically the same over 2,000 hour operation under these conditions.

COMPARATIVE EXAMPLE 2

A sea water desalination test is carried out by the same procedure as in Example 2 except that coagulated sand filtering apparatus is used for pretreatment instead of hollow fiber membrane module units. The coagulated sand filtering apparatus uses ferric chloride as coagulant. The water after the filtration treatment has a turbidity of 0.6 and a FI of 4.5. After 2,000 hour operation under the same conditions as in Example 2, the outflow rate is 36 m$^3$/day, indicating an about 3% deterioration.

We claim:

1. A method for two stage reverse osmosis separation comprising a first stage and a second stage, each comprising a plurality of modules, for collecting 50% or more of desalinated water which meets drinking water standard from seawater fed to the first stage, comprising:

(a) a pretreatment for removing turbidity components from the seawater to produce pretreated seawater;

(b) introducing an inlet stream of said pretreated seawater into a first stage;

(c) collecting a first permeate stream of desalinated water from the first stage and removing a first concentrate stream from the first stage, pressurizing the first concentrate stream so as to raise the feed pressure and supplying the first concentrate stream to the second stage, wherein a total effective reverse osmosis membrane area of said second stage is in the range of 20–80% of that of said first stage, and the ratio of the operating pressure of the first stage, $P_1$, and that of the second stage, $P_2$, satisfies the following relationship:

$$1.15 \leq P_2/P_1 \leq 1.8; \text{ and}$$

(d) collecting a second permeate stream of desalinated water from the second stage and returning a second concentrate stream to an energy recovering unit of said two stage system; and (e) removing the second concentrate stream from the energy recovering unit.

2. A method for multistage reverse osmosis separation of claim 1, wherein $P_1$ and $P_2$ are in the range described below:

$$1.3 \leq P_2/P_1 \leq 1.6.$$

3. A method for multistage reverse osmosis separation of claim 1, wherein the concentrate flow rate at the membrane of the module unit with the largest membrane flow rate ($FR_{max}$: maximum concentrate flow rate at membrane) and the concentrate flow rate at the membrane of the module unit with the smallest membrane flow rate ($FR_{min}$: minimum concentrate flow rate at membrane) are in the relationship described below:

$FR_{max}/FR_{min} \leq 1.5$.

4. A method for multistage reverse osmosis separation of claim 3, wherein the $FR_{max}$ and the $FR_{min}$ are in the relationship described below:

$FR_{max}/FR_{min} \leq 1.3$.

5. A method for multistage reverse osmosis separation of claim 1, wherein the volume of permeated liquid of a module unit is in the range of 30–80% of that of the preceding module unit.

6. A method for multistage reverse osmosis separation of claim 1, wherein the difference between the operating pressure at each stage and the osmotic pressure of the concentrate at that stage is not greater than 50 atm.

7. A method for multistage reverse osmosis separation of claim 1, wherein the flux per unit area of the membrane at the first stage under standard conditions ($F_{fr}$) and that at the final stage ($F_{fn}$) are in the relationship described below:

$1.0 \leq F_{fr}/F_{fn} \leq 1.2$.

8. A method for multistage reverse osmosis separation of claim 7, wherein the recovery of pressure energy is conducted by an energy recovery equipment connected to the high-pressure pump provided at the first-stage module unit for pressurizing feed liquid.

9. A method for multistage reverse osmosis separation of claim 1, wherein the operating pressure of the first stage reverse osmosis membrane module unit is not greater than 70 atm.

10. A method for multistage reverse osmosis separation of claim 1, wherein the operating pressure of the final-stage reverse osmosis membrane module unit is in the range of 80–120 atm.

11. A method for multistage reverse osmosis separation of claim 1, wherein at least the first concentrate stream contains a scale prevention agent.

12. The method for multistage reverse osmosis separation for collecting desalinated water from sea water according to claim 1, wherein the total effective reverse osmosis membrane area of said next stage is in the range of 30–70%.

13. The method for two stage reverse osmosis separation according to claim 12, wherein the pretreatment comprises supplying a permeated liquid from a membrane filter to the first stage.

* * * * *